United States Patent [19]

Eriksson

[11] Patent Number: 4,525,172
[45] Date of Patent: Jun. 25, 1985

[54] METHOD OF DEWATERING A CAKE OF BIOMASS

[75] Inventor: Sture Eriksson, Karlstad, Sweden

[73] Assignee: Armerad Betong Vägförbättringar Aktiebolag, Stockholm, Sweden

[21] Appl. No.: 577,006

[22] Filed: Feb. 6, 1984

[30] Foreign Application Priority Data

Feb. 14, 1983 [SE] Sweden ................................ 8300753

[51] Int. Cl.³ .......................... C10F 7/06; C10F 5/00; C10F 7/00
[52] U.S. Cl. ........................................... 44/32; 44/30; 44/33; 37/3; 110/263; 431/2
[58] Field of Search ...................... 44/27–33; 37/3; 110/263; 431/2

[56] References Cited

U.S. PATENT DOCUMENTS

| | | | |
|---|---|---|---|
| 1,169,679 | 1/1916 | Rigby | 44/27 |
| 1,476,407 | 12/1923 | McDougall | 44/29 |
| 1,686,807 | 10/1928 | Ginsbach | 44/27 |
| 3,603,643 | 9/1971 | Hirota et al. | 44/30 X |

FOREIGN PATENT DOCUMENTS

| | | | |
|---|---|---|---|
| 2850825 | 6/1979 | Fed. Rep. of Germany | 44/27 |
| WO83/01445 | 4/1983 | PCT Int'l Appl. | 44/29 |
| 46995 | 6/1919 | Sweden . | |
| 112272 | 10/1944 | Sweden . | |
| 8101083 | 2/1981 | Sweden . | |
| 18393 | of 1911 | United Kingdom . | |
| 223929 | 10/1924 | United Kingdom | 44/27 |

*Primary Examiner*—Carl F. Dees
*Attorney, Agent, or Firm*—Murray, Whisenhunt and Ferguson

[57] ABSTRACT

A cake of biomass, preferably a peat cake, is dewatered by being pressed at a temperature above 90° C., whereby the water in the cake is displaced by warmer water under successively increased pressure. An apparatus designed as a closed wash press is then used, in which the cake is subjected to dewatering, washing or displacement by warmer water and consequently heating as well as roller pressing.

19 Claims, 5 Drawing Figures

METHOD OF DEWATERING A CAKE OF BIOMASS

FIELD OF INVENTION

The invention relates to the treatment of biomass for the production of fuel. In particular the invention comprises an integrated system for the mining, pre-treatment (including fractioning), dewatering, and further refining (including thermal drying) of peat. The different parts of the system cooperate synergistically to yield an optimal result as regards overall economy, usefulness of the system for different types of peat, end product quality, and environmental protection. Parts of the system may be used separately, however, in connection with conventional systems or other systems, and it is also possible to use certain parts of the system for treating other types of biomass than peat. This concerns especially the drying part.

BACKGROUND ART

The prior art as concerns peat treatment is described extensively in the report from the Swedish Board for Research in Energy Production No. NE 1981:5 and in the Peat Report of The National Swedish Power Administration 1982. The latter report illustrates different peat production methods in a figure on page 4:2. Conventionally, peat is mined either by milling or by cutting. Both these mining methods are dependent on weather, which constitutes a very substantial drawback. The mining season can be extended rather considerably by digging up the peat or by applying the so called hydro-peat method. Neither of these methods makes possible year-round mining, since they do not provide an economically feasible technique to melt frozen peat in the wintertime.

Fractioning is one of the pre-treatment methods. Thus, it is known that dewatering peat by pressing may be considerably simplified if the fine parts fraction, which is difficult to dewater, is separated from the more easily dewatered fibrous fraction. Pre-treatment of peat by such a method, fractioning, may be carried out mechanically in a number of different ways according to known art, e.g. by using sieves, or centrifuges, or by applying the so called Float-wash technique, etc. These known methods make it possible to raise the concentration of dry matter in a pumpable peat suspension to the level of about 10%. The techniques, however, presuppose the absence of ice in incoming peat, which limits the time of use for this equipment. It is not economically feasible to supplement this equipment with additional devices for heating the raw peat in order to melt the ice. Continuous production independent of time of year is therefore not possible, which constitutes a considerable limitation for these systems.

It is also known since a long time that peat constitutes a colloidal system with a strong affinity for water, and that the water which is colloidally bound to the peat will most easily be removed by pre-treatment with additions of different electrolytes. Especially that water which is contained in the colloidal fine parts fraction of the peat is bound in this manner, and it has therefore been considered of interest to find simpler methods or additions, so that this part of the fraction may also be dewatered mechanically. Addition of polyelectrolyte is rather costly. This is especially true when the peat contains a large fraction of fine parts, which is the case when the peat is of the highly humified type and/or if some of the fine parts fraction is recirculated in the system, so that the concentration of fine parts in incoming raw peat is increased.

Methods of pressing are known which will raise the dry matter content to about 30%. Several types of presses have been tested according to the report NE 1981:5 previously mentioned, among them a so called multi belt press in combination with a roller press. A dry substance content of about 30% may be achieved by this known technique. Economic considerations based on press experiments indicate that pressing should not be required to give higher dry substance content than this. To reach higher levels of dry substance content long pressing times are required, which reduces the output of the process considerably. This in turn makes the cost exceedingly high. Therefore still another dewatering step must be applied, namely drying. It is, however, expensive to dry peat which contains as much water as 70%. It is therefore desirable to increase the dry substance content prior to drying, which is not economically possible by applying known art. Therefore, it cannot be stated that known methods of pressing cooperate with the other parts of the equipment in a way which is synergistic to the whole system.

Several methods and devices have been developed for drying. One method is described in SE No. 78 10558-2. According to this method the material is dried in a steam drier, where the material is surrounded by high pressure steam. The steam is generated in a separate boiler, which makes the system rather costly and makes it unrealistic at least for small or medium plants. From this point of view SE No. 78 06720-4 describes a more advantageous method, which however requires an apparatus which only works with direct drying at atmospheric pressure, precluding a high efficiency.

DISCLOSURE OF INVENTION

A purpose of the invention is to offer improvements of one or several of the following phases, namely mining, pre-treatment, dewatering and drying of peat, said phases being parts of an integrated system in which the different departments or phases may cooperate in a way which is synergistic to the whole system.

The purpose of the invention is also to offer new solutions to the problems mentioned above and to compensate for drawbacks of the known methods for mining, pre-treating, dewatering, and drying of peat and/or, at least as far as drying is concerned, of other types of biomass.

In a first part of the system according to the invention a new manner of peat mining is suggested. According to the invention the peat is suspended in water to form a pumpable slurry or suspension which is forwarded to a dewatering plant. It is a characteristic of the invention that the warm water from the dewatering plant is returned to the place of mining, where the water is used to heat the raw peat, preferably to heat it before it is mined. It is preferable to spread the warm water over the moss at a suitable distance from the mining pit in order to heat the peat by letting the warm water at least partly displace the colder moss water. The warm water will also be useful when the peat slurry is prepared and the colder moss water should preferably be drained off to the mining pit. Said warm water will also contain a fraction of fine peat parts which has been separated in the dewatering plant, and this fine parts fraction will be spread over the moss together with the warm water, so that the fine parts fraction is mixed with the coarser material in the upper layers of the moss. Most of the fine parts fraction spread over the moss will little by little be returned to the mining pit after possibly having passed through the raw peat layers of the moss and/or through the dewatering plant one or more times. In order to prevent substantial amounts of the warm water spread out to flow directly into the pit without first passing through the deeper layers of the moss a wall of mined peat may be placed between the edge of the pit and that area of the moss where the water is being spread. A special advantage in integrating peat mining with a subsequent dewatering is also that the warm return water in the wintertime may be used to melt frozen peat, making it possible to mine it and suspend it in water. In this way the invention makes a true year round mining possible. It is preferable to let the warm return water contain peat ash as well, which will both destroy some of the colloidal bonds in the peat and raise the pH-value of the water which is being drained off to the mining pit together with the fine parts fraction. This will enhance the possibilities of planting forests or practising agriculture on the moss after completion of mining. In addition to or as a replacement of peat ash other chemicals may be added to break down the colloidal bonds of the peat in a conventional manner.

The mining itself may be carried out by conventional as well as newly developed equipment. The principle of hydropeat as well as conventional excavating may be used. If an excavator is used, it should be remote controlled, unmanned and insensitive to stumps.

Another purpose of the invention is to offer a pretreatment of the suspended peat, said pre-treatment being suitable for integration both with the peat mining just described and with a further dewatering by pressing to reach a high concentration. Another purpose of the pre-treatment is to improve the drainage ability of the peat and to raise its concentration. According to this part of the invention the peat-water slurry is dewatered in a number of dewatering devices connected in series, at the same time as some of the fine parts fraction of the peat is removed with the return water. The screens of the dewatering devices are cleaned by flushing with warmer water, which is preferably taken from one of the succeeding devices. The last of the dewatering devices connected in series may be flushed with warm water from a succeeding plant for final pressing.

The use of flush water improves the drainage ability of the peat. In order to improve the drainage ability further in an already known way suitable chemicals are added, especially metal salts (positive metal ions), in order to break some of the colloidal systems in the peat by a combination of chemical, thermal, and mechanical treatment. Said chemicals may preferably be added totally or partly in the form of peat ash, which may be obtained in a part of the system where drying takes place. Said mechanical treatment comprises homogenizing the dewatered peat cake from each of the dewatering device and the warmer return water from the succeeding device. It is preferable to use closed dewatering devices. The suspension which is fed to the first of the dewatering devices connected in series will normally have a dry matter content of up to 5%, a concentration of 2-3% being suitable, with a temperature of 10°-30° C., while the slurry which leaves the last dewatering device may have a concentration of 5-12%, 6-10% being suitable, i.e. about the same dry matter content as in the untreated raw peat of the moss, and it has a temperature of 40°-80° C., preferably 50°-70° C. The chemicals, preferably peat ash, are conveniently added to a buffer stock before the first dewatering device.

Still another purpose of the invention is to provide a method of pressing which will not require long press times, which in turn means a high efficiency. The comparatively short press time is reached by freeing the peat from much of the fine parts fraction, by breaking the colloidal bonds through an addition of above mentioned chemicals, preferably peat ash, and by pressing at a raised temperature. Specifically the temperature is higher during this stage than in the preceding dewatering devices, preferably above 90° C. A special characteristic of the invention is that the water in the peat cake is preferably displaced by the warmer water while the pressure is gradually increased. Normally this displacement of water in the peat cake by warmer water will take place in liquid phase, but it is also possible to foresee such a displacement of the water in the peat cake by using steam, which however should take place without causing the water in the peat cake to vapourize.

Several different types of apparatuses may be utilized to carry out the pressing. One suitable apparatus comprises a closed wash press, in which the peat cake is subjected to dewatering, washing, or displacement by warmer water and consequent heating followed by roller pressing. The specific pressure in the press nip is advantageously at least 300 bars, preferably at least 400 bars and suitably more than 500 bars. Several such presses may be employed, in which case the water in the peat cake is not displaced by warmer return water in the last press. The return water from the first press is used as flush liquid in the last of the preceding dewatering devices. To heat the peat cake and to displace the water in that or those presses where washing or replacing takes place it is appropriate to use the condensate from a succeeding peat drier.

Still another purpose of the invention is to offer an improved method of drying, which may also be applied to other types of biomass than peat, such as ground bark, saw dust, forest refuse, etc. According to this part of the invention the mass is dried in at least two steps, the first step employing hot flue gases in a heat exchanger to dry the mass with the vapour pressure of the vapour phase being higher than in a succeeding step, and the vapour generated in the first step after being separated from the mass being employed to heat the mass in the succeeding step. Preferably the mass in the first step is dried in a tube heat exchanger, the tube/s/ transporting the biomass being heated by hot flue gases. It is suitable to mix the partly dried biomass from the first step with the flue gases leaving the first heat exchanger, so that the flue gases by direct drying further dries the mass by vapourizing water, at the same time as the mass cools the flue gases, after which the mass is separated from the flue gases. The predried biomass may then be transported through tubes, channels or the like in a second heat exchanger, preferably a tube heat exchanger of the column type, in which that steam flows, which is obtained through dewatering of the biomass in the first step by means of the flue gases, said steam having a higher temperature than the mixture of mass and steam in said tubes or channels, so that the mass by indirect heating is further dried in a conventional manner by transferring energy from steam of a higher temperature to steam of a lower temperature in those tubes or channels transporting the biomass in said second heat exchanger.

Finally the biomass may be subjected to drying in a rotating double walled drum drier, in which the space between the outer casing and the inner casing is flowed through by steam of a higher temperature than the temperature of the inside of the drum. The mixture of air and steam from the inside of the drum may be used as air of combustion in the furnace where said flue gases are produced.

Other purposes and characteristics of the system as well the different parts of the system will be apparent from the following description of one embodiment of the integrated system and from the following patent claims.

BRIEF DESCRIPTION OF DRAWINGS

In the following description of a preferred embodiment of the integrated system reference will be made to the following drawings, of which

DESCRIPTION OF A PREFERRED EMBODIMENT

The plant to be described with reference to the figures is a plant in the project stage. It should be understood that those values of temperatures, concentrations and pressures, which are indicated in the drawings or mentioned in the text generally are computed values, and that it is natural that values obtained in practice will differ from computed values according to circumstances which are difficult to foresee at the projecting stage. Those numerical values given should therefore not be regarded as a limitation to the principles of the invention but rather as an illustration of the ideas of the invention.

Figure 1:
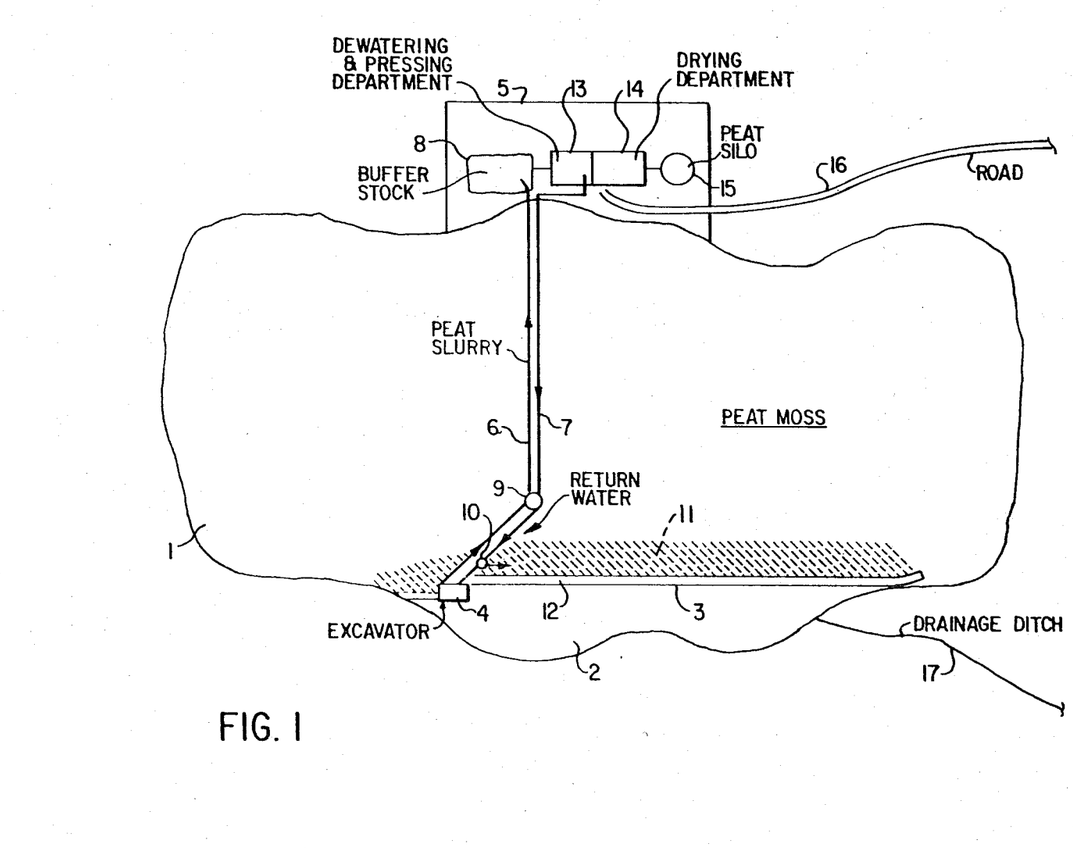
FIG. 1 shows a schematic outlay of a peat moss with plants and equipment for mining, dewatering and drying peat.

Referring first to FIG. 1 a peat moss is designated 1 and a mining pit is designated 2. The edge of the mining pit 2 is designated 3. The main part of the plant are a pit excavator 4, a factory 5 at the edge of the moss for dewatering and drying and pipe or hose lines 6 and 7 for transporting peat slurry to the factory 5 and for retransporting return water to the mining area. The peat is mined to full depth by means of the excavator 4, which is preferably remote controlled and unmanned. The peat is comminuted and strained at the mining place and then transported at a concentration of about 2.5% to a buffer stock 8 in the factory 5. It is suitable to let the excavator 4 be a caterpillar. A shift station 9 is located between the excavator 4 and the factory 5 to accomodate surplus hose, while the hose parts between the shift station 9 and the factory 5 are suitably placed in the moss 1 at a frostproof depth. The suspension or slurry is pumped though the line 6 to the plant 5, and line 7 returns water which has a temperature of about 30° C. The warm return water contains a fine parts fraction of the peat, which has been separated in the factory 5, as well as peat ash which has been added in the factory 5 to break the colloidal bonds in the peat-water suspension. This return water is spread on the moss behind the excavator 4 at a suitable distance from the edge 3. No fresh water is added to the system. The return water which is spread in said manner on the moss will penetrate down through the raw peat layers of the moss and displace to a considerable degree the existing colder moss water, which will be filtrate into the pit 2. The point for spreading return water has been designated 10, the distance between point 10 and edge 3 being so chosen that the water thus spread to no considerable extent pours down over the edge 3 but rather penetrates down into the moss 1. The area of the moss thus watered is schematically designated 11 in FIG. 1. In order to ensure further that this water to no considerable extent pours over the edge 3 it is suitable to place a wall of mined peat between the edge 3 and the watered area 11. By replacing the colder moss water in this way the return water will heat the peat very efficiently. The main volume of the return water which is spread on the moss is recycled when the suspension is made, which means that a considerable part of the fine parts fraction which is separated in the factory 5 and returned through the line 7 will also be recycled together with the slurry in line 6. Normally the deeper layers of the moss are more humified than the upper layers which will contain coarser material. By spreading the return water containing fine peat parts on the moss on top of the coarser material a certain homogenization is obtained as regards coarser and finer fractions. The system also implies a greater fraction of fine parts in the suspension in line 6 than in the unaffected raw peat of the moss 1 after a point of equilibrium is reached, but by adding peat ash to the return water which is spread on the moss the chemical treatment of the peat is initiated already at the site of mining it. This means that the break-down of the colloidal bonds will start already in the moss and in the slurry line 6, which largely compensates the larger fraction of fine parts. Since the peat ash contains a high amount of CaO, the pH of the moss water will also be raised, which is advantageous in case the moss after completed mining shall be reused for forestry or agriculture.

Apart from a high amount of CaO, e.g. 40% CaO, the peat ash contains also other oxidic metal compounds such as oxides of sodium, potassium, iron, magnesium, and silicon. Divalent and trivalent positive ions are of importance for decoagulating the colloids, i.e. to break the colloidal bonds. Examples of metals in the peat ash forming active electrolytes are calcium (Ca 2+), iron (Fe 3+), and aluminium (Al 3+), etc. The peat ash is added to the buffer stock 8. It is suitable to add a surplus of peat ash so that it may be active in the break-down of colloidal bonds in all parts of the system, including the moss 1. It is also conceivable to add peat ash in the return line 7. In addition to the buffer stock 8 the factory 5 contains a pre-treatment and pressing department 13, a drying department 14, and a peat silo 15. A connecting rod to the factory 5 is designated 16 and a drainage ditch from the pit 2 is designated 17.

Figure 2:
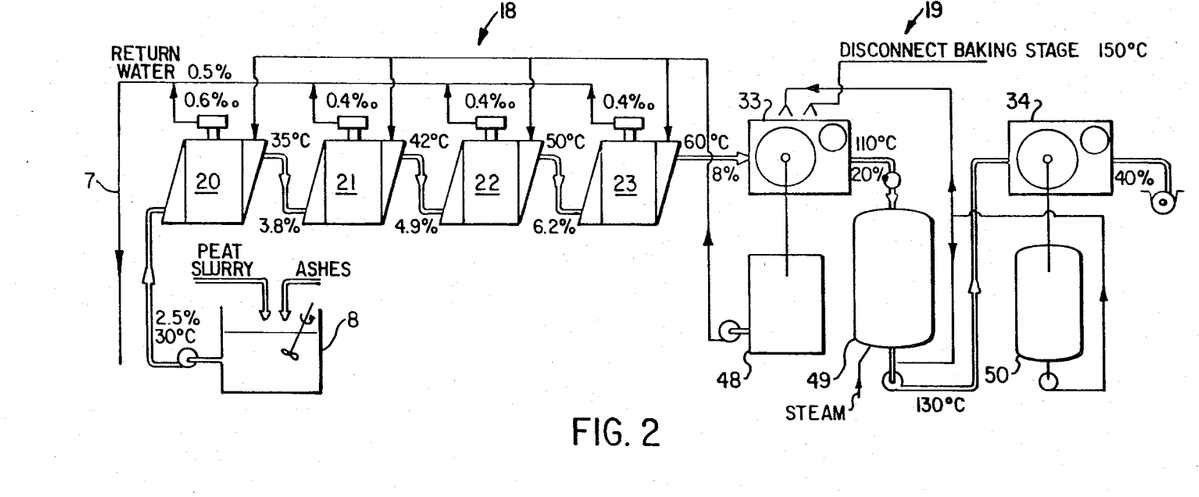
FIG. 2 shows a block diagram of a pre-treatment and pressing plant.

FIG. 2 schematically illustrates the layout of the pre-treatment and pressing department 13 of FIG. 1. This department comprises a pre-treatment section 18 and a pressing section 19. The pre-treatment section 18 comprises four dewatering devices 20, 21, 22 and 23 connected in series. The slurry enters the first dewatering device 20 from the buffer stock 8, to which the peat ash is added and mixed with the slurry from the excavator 4. It has then a concentration of 2.5% and a temperature of about 30° C. In this first dewatering device 20 the dry matter content is raised to 3.8% and the temperature is raised to 35° C. and in the following devices 21, 22 and 23 to 4.9% and 42° C. 6.2% and 50° C., and 8% and 60° C., respectively. The last device 23 consequently yields a dry matter content which roughly corresponds to the dry matter content of the raw peat in the moss 1. A fine parts fraction is separated from the first dewatering device 20 which corresponds to about 0.6°/$_{oo}$ dry matter and in the devices 21-23 to follow a fine parts fraction corresponding to 0.4°/$_{oo}$ dry matter is separated into the return water. The return water which is returned in line 7 consequently contains about 0.5°/$_{oo}$ dry matter in the form of fine parts.

Figure 3:
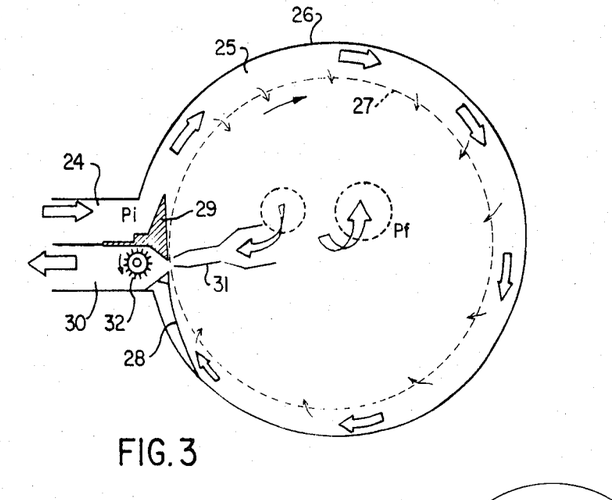
FIG. 3 illustrates schematically the function of a dewatering device meant to be used for pre-treating peat in the process of initial dewatering and fractioning.

In FIG. 3 the function of the four dewatering devices 20-23 connected in series is schematically illustrated. The peat suspension enters through inlet 24 into the space 25 between an outer casing 26 and a rotating sieving drum 27 which is covered by a screen cloth in a conventional manner. The pressure $P_s$ inside the sieving drum 27 is lower than the entrance pressure $P_i$ on the outside of the drum. Water containing some of the fine parts fraction is thus sucked in through the screen cloth, which may have a mesh number of 130, passes through the sieving drum 27 and is diverted preferably in axial direction. The mass in the space 25 gradually grows thicker. At the exit of the space 25 an exit sheet 28 and a doctor blade 29 are attached in a conventional way in the area of an exit line 30. From the inside of the rotating sieving drum 27 flush liquid is directed towards the inside of the drum in the space between the exit sheet 28 and the doctor blade 29. The flush water inlet is designated 31. The flush water being pressed in this way through the sieving durm 27 is obtained from the succeeding sieves, as is illustrated schematically in FIG. 2. The peat cake thus obtained is consequently removed by means of the doctor blade 29 under the influence of the warmer flush water 31, after which the peat cake and the warmer flush water are homogenized by means of a rotor. This will mechanically contribute to the break-down of the colloids, so that the continued dewatering and fractioning will be further facilitated in the succeeding devices, which is one of the effects of connecting several devices in series instead of using one single large device. The increasing temperature also enhances the break-down of colloids as does the peat ash which was added to the buffer stock 8.

The effect of raising temperature on the speed of drainage and hence the ability of dewatering is determined by Darcy's equation:

$$\frac{dV}{dt} \sim \frac{A \cdot \Delta p}{\mu \cdot L \cdot cv}, \text{ where}$$

V = volume of filtrate
A = area of press
Δp = difference of pressure
μ = viscosity of liquid
L = peat cake thickness
cv = factor of resistance to drainage By raising temperature the μ-value, i.e. the viscosity, is reduced, which will increase the drainage rate.

By repeating thickening in the four dewatering devices 20-23 connected in series the degree of fractioning, i.e. the separation of the finest parts of the peat, is increased. The relation between incoming and exiting concentrations is determined by the speed of the drum 27 and by the difference in pressure between the inlet for the suspension ($P_i$) and the outlet for the filtrate ($P_s$). The flow of return water, i.e. the flow of warmer return water added through line 31, is kept at a level which ensures the required concentration in line 30, i.e. in the inlet of the next dewatering step. By adding warm return water as a flush liquid colder incoming suspension liquid is gradually replaced by this warmer water, which constitutes one step in optimizing further dewatering.

Figure 4:
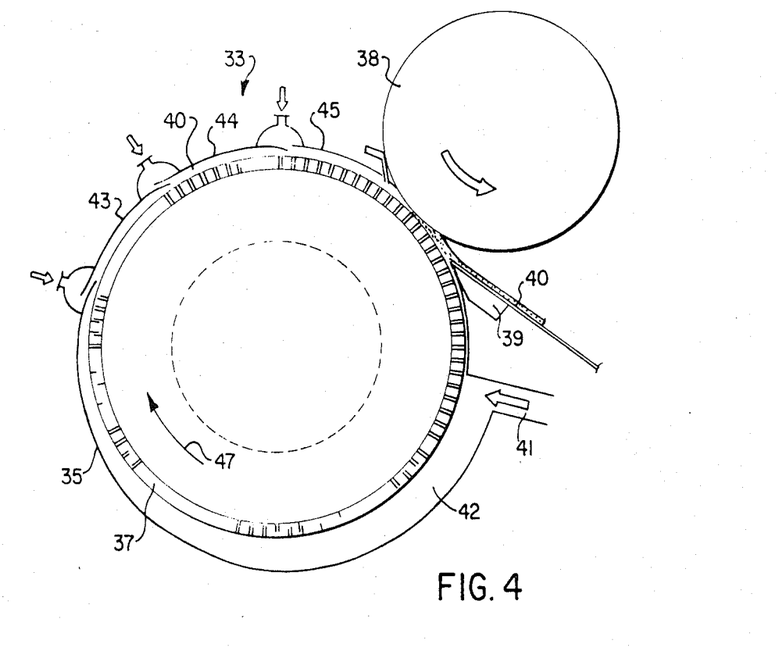
FIG. 4 illustrates schematically a device meant to be used for pressing peat.

The pressing operations in section 19 are carried out by two presses connected in series, which may be modified wash presses. These are designated 33 and 34 in FIG. 2. More particularly it is suitable to employ presses av a type which can dewater the biomass at a temperature of 90°-130° C. and also at a superatmospheric pressure. The first of these two presses, the press 33, carries out three operations simultaneously: dewatering, washing or displacement and roller pressing. A press suitable for these operations is schematically shown in FIG. 4. The press, which may be designed as a wash press for paper pulp, consists of a casing 35, a sieving drum 36 rotating in the direction of the arrow 47, a press roll 38, and a doctor blade 39 to peel off the peat cake 40.

Dewatering in the press 33 rests on the same fundamental principle as do the previously described closed dewatering devices 20-23. The peat mass or corresponding biomass is fed through a line 41 into a tapering space 42 between the casing 35 and the sieving drum 37, which like the drums in the previous dewatering devices is covered with a sieving screen in a conventional manner. The slurry follows the speed of the drum 37 in the converging space 42, causing water slowly to be pressed out through the perforated surface of the drum 37. The filtrate is drained from the inside of the drum. At the end of the converging space 42 a number of flaps 43, 44 and 45 are situated. In the space 46 between these flaps and the sieving drum 37 water is pressed in and through the bed of peat mass towards the drum 37 at a high temperature, 90°-130° C., preferably over 100° C. This displaces the suspension liquid still left in the mass, so that said liquid is pressed into the drum 37 through the perforations and is replaced by cleaner and warmer liquid, which makes possible a dewatering to a higher dry matter content in the succeeding roller press operation.

In the last part of the dewatering sequence in the press 33 the mass cake is subjected to high pressure and dewatering in an extended press nip between the press roll 38 and the sieving drum 37. The transfer to the press roll does not lower the pressure, which prevents the mass cake from being crushed in the roller nip and flowing backwards. It is possible to raise the nip pressure to 600 bars. The press 33 makes it possible to raise the concentration in the peat mass quickly from about 8% dry matter in the inlet 41 to about 20% in the press cake 40 leaving the press by combining a high pressure and efficient drainage on the basis of effectively using the possibilities expressed in Darcy's equation, as stated above. It should be noted in this connection that the resilience of the peat cake is reduced as a result of the high temperature, which makes it possible to reduce the thickness of the cace more efficiently, which also improves the drainage effect.

The filtrate from the press 33 is directed to a container 48 and therefrom put to use in a pre-treatment section 18, as described above. The peat cake 40, which may have a temperature of 110° C. and a dry matter content of about 20%, is forwarded to a container 49, in which the temperature of the cake is further raised with steam to about 130° C. From the container 49 the mass is moved to yet another press 34 in order to be dewatered further at said high temperature, about 130° C., reaching a dry matter content of up to 40%. The press 34 may be of the same kind as the press 33, but at this high temperature no washing or displacement take place. The filtrate is drained to a container 50 to be used partly to dilute the mass from the container 49, partly to be used as displacement liquid in the press 33. In addition to this, condensate from the following drier 14 is also used as displacement liquid in the press 33.

Figure 5:
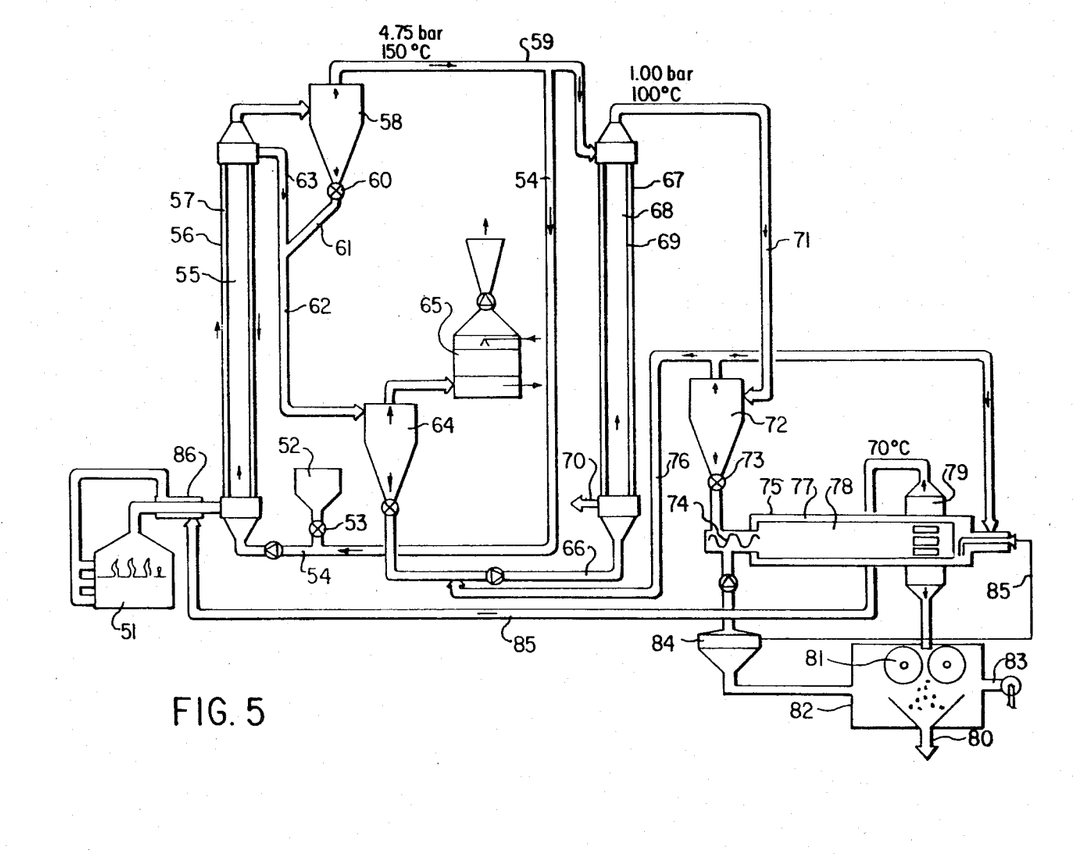
FIG. 5 shows a schematic outlay of a drying plant.

The drier 14 will be described more in detail with reference to FIG. 5. The heat for the drying process is generated by burning a certain amount of the finally dried peat or corresponding biomass in a furnace 51. This requires burning about 10% of the dry matter. The mass entering the drier is filled into a funnel 52, passes through a sluice 53, and is mixed with steam in line 54. The comminuted mass (in the following this mass is called peat, even if other types of biomass are conceivable) is blown upwards through a number of tubes (symbolically designated 55) in a first tube heat exchanger column 56. The flue gases from the furnace 51 are also led upwards through the column 56, so that the hot flue gases surround the tubes 55 in the column making some of the water in the peat evaporate by indirect heating by means of the flue gases in the space 57 surrounding said tubes 55. This decreases the temperature of the flue gases from about 1300° C. to 300 à 500° C. From this first drying step the peat is forwarded to cyclone 58, where it is separated from the steam leaving by line 59. Some of the steam is directed down through line 54 to be mixed with incoming peat, as already mentioned, while the peat leaves the cyclone 58 downwards through a sluice 60 and a line 61 and is further mixed with the flue gases which leave column 56 through line 63 in a shute 62. When these flue gases meet the peat in shute 62 they have a temperature of 300 à 500° C. In this way still more of the water remaining in the peat is evaporated, at the same time as the peat cools the flue gases to about 100° C. before this mixture of peat and flue gases reaches a second cyclone 64. In the cyclone 64 the flue gases are separated from the peat. The flue gases are led to a scrubber 65, where they are washed, before being let out into the atmosphere. Together with the flue gases a certain amount of water in the form of steam is also lost, this constituting the only loss of water of the whole integrated system.

From cyclone 64 the peat is led in a circulating flow of steam through a line 66 to a second tube heat exchanger column 67. The peat is blown upwards through parallel tubes 68 in the column 67, said tubes being surrounded by steam flowing downwards in the surrounding space 69. That steam which brings the peat up through the tubes 68 has a lower temperature and pressure (100° C. 1 bar) than that of the steam flowing downwards in the surrounding space 69, (150° C., 4-5 bars), making it possible for the surrounding steam to further evaporate some of the humidity in the peat by indirect heating. The condensate from the surrounding space 69 is drained in the bottom of column 67 to be used as displacement liquid in the press 33. FIG. 4, line 70.

The peat which has been further dried in column 67 is brought through line 71 at a pressure of 1 bar and about 100° C. to a third cyclone 72. In this third cyclone 72 the peat is separated from the steam and led through a sluice 73 to a feeding screw 74 which feeds it to a doublemantled, rotating drying drum 75. Steam from the cyclone 72 is partly led through a line 76 to join the circulating steam system, as described, and partly led to the exit of the drying drum 75 in order to be entered into the space 77 between the inner and outer mantles of the rotating drum.

In the drum 75 heat is transferred from the outer space 77 to the inner space 78 of the drum, so that the peat gradually being fed through the drum 75 is further dehumidified. At the outlet the drum 75 is surrounded by an all-encompassing hood 79. The inner and outer mantles of the drum 75 are provided in this area with openings for diversion of finally dried peat to the hood 79, from which the peat is finally moved to a pelletizer 81, from which pellets are transferred to the peat silo 15 through a line 80. The pelletizer 81 is put into a box 82, into which fresh air is blown through line 83. This fresh air containing the dust caused by pelletisation is blown to an aerotemper 84, which is heated by steam and condensate via line 85. From the aerotemper 84 the hot air is led to the feeder 74 to be mixed with the peat. Air-steam mixture from the hood 79 is led through a line 85 to a heat exchanger 86, where the air-steam mixture is heated by the flue gases from the furnace 51, after which the heated gas is entered into the furnace 51 to be used as combustion air.

I claim:

1. Method of dewatering peat or other biomass, said method comprising the steps of:

preparing a water suspension of said biomass; forwarding said biomass suspension to a dewatering plant;

pre-dewatering said biomass suspension in said dewatering plant to produce pre-dewatered biomass, said pre-dewatering being effected by passing said biomass suspension through a series of pre-watering devices so that at least 50% of the water content in said biomass suspension has been removed when said biomass leaves the last of said pre-watering devices in said series;

transferring said pre-dewatered biomass in the form of a cake to at least one closed wash press;

wash press dewatering said pre-dewatered biomass in said at least one closed wash press by subjecting said cake to further dewatering, washing, or displacement of water therein by water which is warmer than said cake, and subsequently subjecting said cake to warming and roller pressure under gradually increased pressure at a temperature which is above 90° C. in the region of highest pressure of said roller pressing;

returning hot return water from said roller pressing to at least the last of said pre-dewatering devices so as to raise the temperature of the biomass in the last pre-dewatering device to thereby reduce viscosity of the biomass and increase drainage rate;

drying said mass in a succeeding dryer subsequent to said wash press dewatering.

2. Method according to claim 1, wherein the displacement of the water in said cake is done by warmer water in liquid phase.

3. Method according to claim 1, wherein the displacement of the water in said cake is done by steam without vaporization of the water in said cake.

4. Method according to claim 1, wherein said press has a nip pressure of more than 300 bars.

5. Method according to claim 4, wherein said nip pressure is more than 400 bars.

6. Method according to claim 5, wherein said nip pressure is more than 500 bars.

7. Method according to claim 1, wherein a fine parts fraction is separated from the biomass in said pre-dewatering devices, and a chemical is added to the biomass before the biomass enters the press to break some of the colloidal bonds in said biomass and thereby in conjunction with the high temperature to improve the drainage ability of the biomass.

8. Method according to claim 7, wherein said chemical is peat ash.

9. Method according to claim 7, wherein the biomass in the form of a cake is dewatered in a first press and subsequently in a second press, the water in the cake of biomass being displaced at least in the first press by warmer return water from a succeeding press.

10. Method according to claim 1, wherein a condensate from said succeeding dryer is used to heat the biomass cake and to displace the water in said cake.

11. Method according to claim 1, wherein the biomass is subjected to a combination of chemical, thermal, and mechanical treatments in order to improve the drainage ability of the biomass in said pre-dewatering devices by breaking some of the colloidal systems in the biomass, said chemical treatment including adding peat ash to the biomass, and said thermal and mechanical treatments comprising homogenizing the pre-dewatered biomass from each of said pre-dewatering devices and warmer return water from a succeeding pre-dewatering device.

12. Method according to claim 10, wherein the biomass in said succeeding dryer is dried in at least two steps, said first step employing flue gases drying the mass in a heat exchanger in a vapor phase where the vapor pressure is higher than the vapor pressure in the succeeding step, and wherein the steam generated in the first step after being separated from the biomass is used as a heating medium in a second step.

13. Method according to claim 12, wherein the mass is dried in the first step indirectly in a tube heat exchanger having one or more channels heated by hot flue gases, said biomass being transported through said channels.

14. Method according to claim 12, wherein partly dried biomass from the first drying step is mixed with flue gases leaving a first heat exchanger, said flue gases thereby directly drying the mass further by vaporizing water, concurrently with being cooled by the said flue gases, after which said mass is separated from said flue gases.

15. Method according to claim 12, wherein the pre-dried biomass is lead through channels in a second heat exchanger, said second heat exchanger being blown through by steam generated in the first drying step, said steam having higher temperature than the mass and the steam in said channels of said second heat exchanger, whereby said mass is further dried by indirect heating and energy being transported from steam of a higher temperature to steam of lower temperature in those channels which are transporting the biomass in said second heat exchanger.

16. Method according to claim 12, wherein the biomass is subjected to a final drying in a rotating double mantled drum to produce a dried material, wherein steam of a higher temperature than the temperature inside the drum is passed between the outer and the inner mantle of said drum.

17. Method according to claim 16, wherein a mixture of steam and air from inside said drum is used as air of combustion in a furnace where flue gases are generated.

18. Method according to claim 17, wherein the air of combustion to the furnace contains ventilation air including dust from a pelletizing room.

19. Method according to claim 17, wherein part of the dried material is used as a fuel in the furnace.

* * * * *